United States Patent [19]

Mano

[11] Patent Number: 5,070,524
[45] Date of Patent: Dec. 3, 1991

[54] TELEPHONE SYSTEM
[75] Inventor: Hiroshi Mano, Hino, Japan
[73] Assignee: Kabushiki Kaisha Toshiba, Kawasaki, Japan
[21] Appl. No.: 605,411
[22] Filed: Oct. 30, 1990

[30] Foreign Application Priority Data

Oct. 30, 1989 [JP] Japan .................................. 1-282163

[51] Int. Cl.⁵ ........................ H04M 1/60; H04M 3/40
[52] U.S. Cl. ..................................... 379/165; 379/395
[58] Field of Search .................. 379/165, 93, 94, 395, 379/394, 358

[56] References Cited
FOREIGN PATENT DOCUMENTS 0164194  6/1989  Japan ................................... 379/165

Primary Examiner—Stafford D. Schreyer
Attorney, Agent, or Firm—Foley & Lardner

[57] ABSTRACT

In a key telephone system connectable to both ISDN and PSTN, for the purpose of compensation of a difference in speech signal level between ISDN and PSTN, digital pads are incorporated in an ISDN interface unit mounted on a key service unit of this system. In the digital pads, original PCM-code speech signals received/transmitted from/to the ISDN line are converted into PCM-code speech signal with a compensated speech signal level obtained by adding a selected gain to the original speech signal level. Since the difference in the speech signal level between ISDN and PSTN differs according to the conditions, an appropriate gain is selected from a plurality of previously prepared gains. That is, the relationship between telephone numbers and information signals indicative of the selected gain is registered in the key service unit. Therefore, when conversation is made to a subscriber whose telephone number has been registered through the ISDN, a gain registered in correspondence to the subscriber's telephone number can be selected automatically.

6 Claims, 10 Drawing Sheets

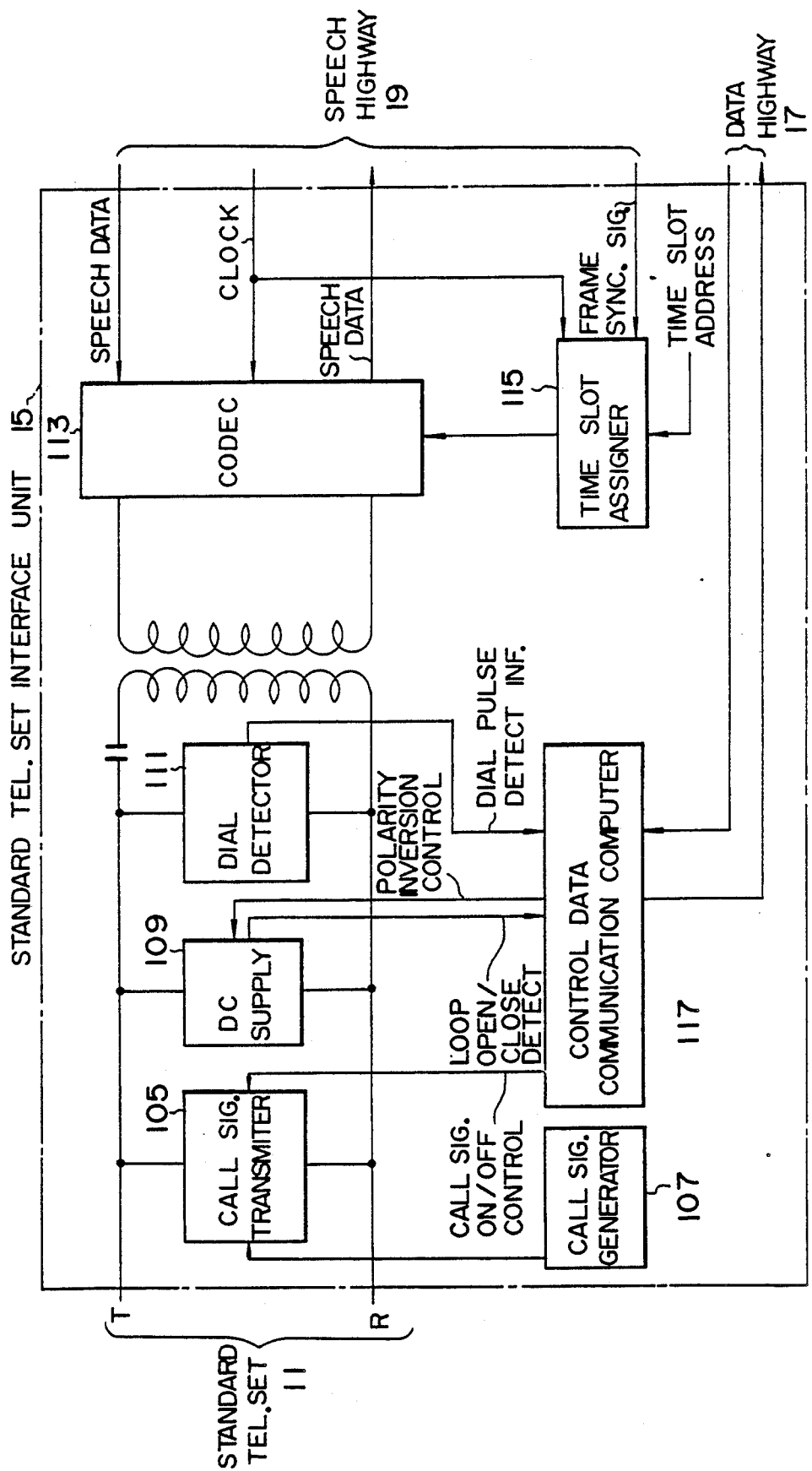
F I G. 8

TELEPHONE SYSTEM

BACKGROUND OF THE INVENTION

The present invention relates to a telephone system and more specifically to a transmission level regulating method for a telephone system connectable to both analog and digital communication networks.

As an example of telephone system of this type, there exist key telephone system connectable to both the integrated service digital network (ISDN) and the (analog) public subscriber telephone network (PSTN). FIG. 1 shows a typical system configuration of this telephone system. On a key service unit 1, there are mounted an ISDN interface unit 5 connected to an ISDN line 3, a PSTN interface unit 9 connected to a PSTN line 7, an extension terminal interface unit 15 connected to a line 13 from an extension terminal 11, etc. These interface units are connected to a control unit 20 for controlling the entire key service unit and channel switching, via a data highway 17 serving as a time-sharing transmission line for control data and a speech highway 19 serving as a time-sharing transmission line for speech PCM (pulse code modulation) codes.

Here, there exists a loss of 4 dB on an average between a subscriber for the PSTN line 7 and a terminal office. In addition, some loss is inevitably produced in a 2-4 line switching circuit and a CODEC (coder/decoder) of an office line (PSTN) interface unit 9. Further, in general the key service unit 1 is so designed that there exists a loss of about −1 dB between the office line (PSTN) interface unit 9 and the individual telephone set interface unit 15.

On the other hand, no loss exists between a subscriber for the ISDN line 3 and a terminal office. Further, the conventional ISDN interface unit 5 performs only signal representation transformation between ternary codes and binary codes, speed conversion between 64 Kb and 2,048 Mb, multiplexing, separation, etc. in general, without performing conversion with respect to the speech PCM codes.

As a result, when an extension telephone set 1 is connected to an outside line telephone set such as an analog telephone set 23, there arises the following problem: Since both the ISDN and PSTN lines are connected to the key service unit 1, although telephone conversation can be made through any one of the two lines, there exists a difference in speech (transmission) level between the two lines, because the loss through the PSTN line 7 is different from that through the ISDN line 3, as already explained. In other words, the speech level differs according to the used network, when conversation is made with the same person. The similar difference in the speech level occurs between when the extension telephone set 11 is connected to a digital telephone set 21 and when the extension telephone set 11 is connected to an analog telephone set 23. In addition, the difference in speech level changes being subjected to the influence of installation conditions of the lines 3 and 7 and the key service unit 1.

As described above, in a telephone system connected to both the analog and digital communication networks, there exists a problem in that the speech (transmission) level differs according to the connected network and further the level difference varies according to the device installation conditions, thus resulting in a difficulty in maintaining an appropriate speech level all the time.

SUMMARY OF THE INVENTION

With these problems in mind, therefore, it is the object of the present invention to provide a telephone system which can automatically regulate the speech level, irrespective of the connected networks To achieve the above-mentioned object, the present invention provides a telephone system connectable to both a digital communication network and an analog communication network which comprises:

(a) terminal means provided with functions of transmitting/receiving speech signals;

(b) digital network interface means for providing an interface for communicating the speech signals in digital code form between the terminal means and the digital communication network;

(c) analog network interface means for providing an interface for communicating the speech signals in analog signal form between the terminal means and the analog communication network;

(d) speech level attenuating means for selecting a gain required to compensate for a difference in relative speech signal level between the digital communication network and the analog communication network, and for adding the selected gain to the speech signals communicated in digital code form between the terminal means and the digital communication network; and (e) gain control means for controlling the gain selection by the speech level attenuating means.

BRIEF DESCRIPTION OF THE DRAWINGS

FIG. 8 is a block diagram showing a standard telephone set interface unit of the above embodiment;

DESCRIPTION OF THE PREFERRED EMBODIMENT

Figure 1:
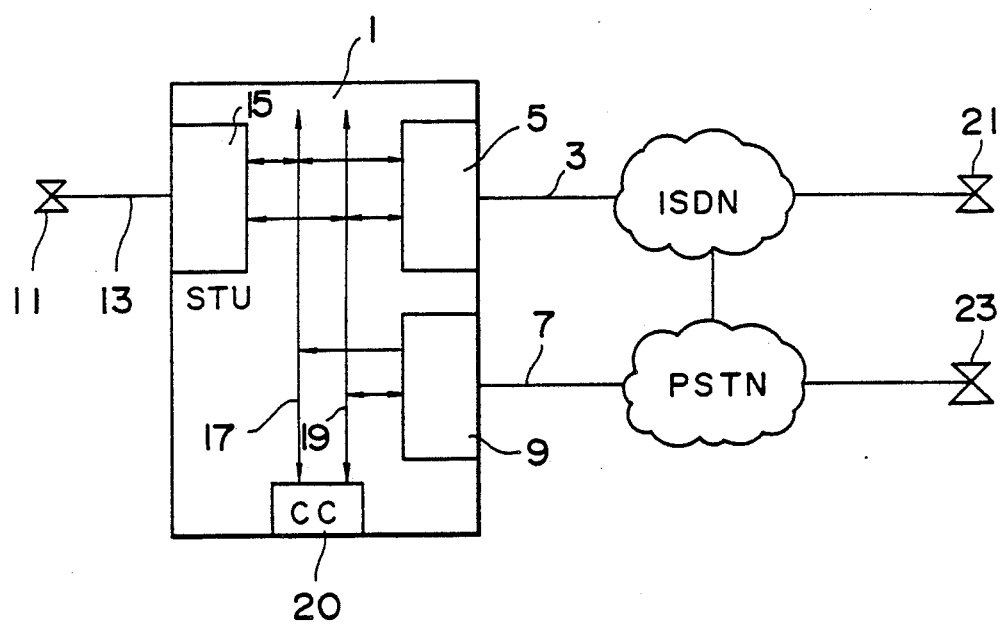
FIG. 1 is a block diagram showing the general system configuration of a key telephone system connectable to both the two networks of ISDN and PSTN.

A preferred embodiment of the present invention will be explained hereinbelow with reference to the attached drawings. The embodiment described below is a key telephone system whose basic system configuration is the same as shown in FIG. 1. In more detail with reference to FIG. 1, a key service unit 1 comprises an ISDN interface unit 5 connected to an ISDN line 3, a PSTN interface unit 9 connected to a PSTN line 7, and a standard telephone device interface unit 15 connected to an extension telephone set (e.g. a standard telephone set) 11. These interface units are connected to a central control unit 20 for controlling various calling and switching processing via a data highway 17 and a speech highway 19.

Figure 2:
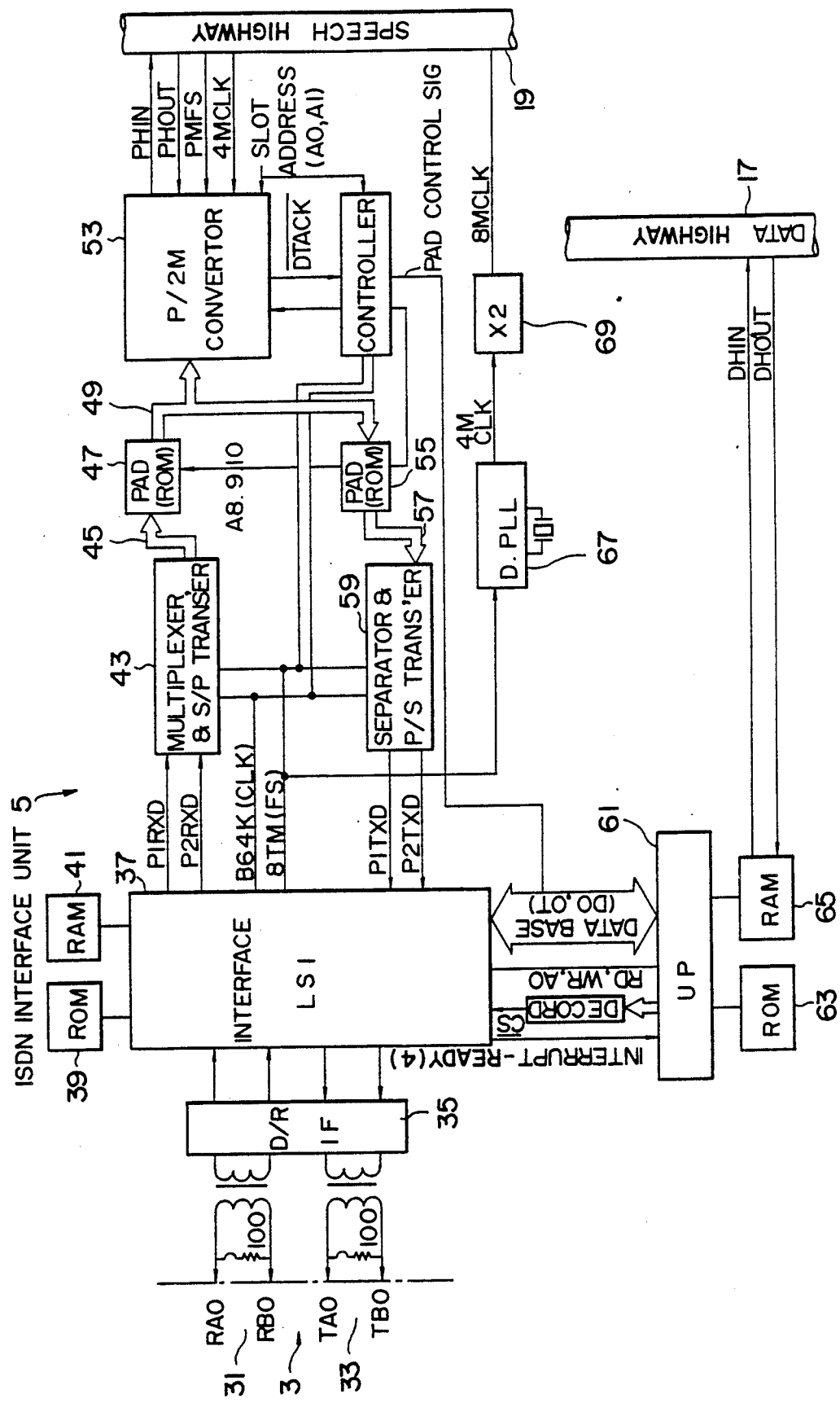
FIG. 2 is a block diagram showing an ISDN interface unit used for an embodiment of the key telephone system according to the present invention.

FIG. 2 shows a configuration of the ISDN interface unit 5 of the present embodiment. In FIG. 2, 2-channel speech data and 1-channel control data fed through a receive interface line 31 of the ISDN line 3 are converted from ternary signal to binary signal, and then applied to an interface LSI 37. In this LSI 37, processing related to two different layers (e.g. separation of speech data (layer 1) from control data (layer 2)) in accordance with programs or other information for controlling the operation of the interface LSI 37, which are stored in a ROM 39 and a RAM 41. The separated speed data are inputted to a multiplexing and serial/parallel transforming section 43 via a first port receive data line P1RXD and a second port receive data line P2RXD. In the multiplexing and series/parallel transforming section 43, 2-channel speech data transmitted in serial mode at 64 Kbps are multiplexed into 128 Kbps, transformed into parallel mode, and then fed to a bus 45. These parallel speech data (8-bit PCM codes) are inputted to a ROM (i.e. receive digital pad) 47, and 8-bit PCM codes stored at an address area corresponding to the speech data are read out of the receive digital pad (PAD) 47 and then fed to a bus 49.

Figure 3:
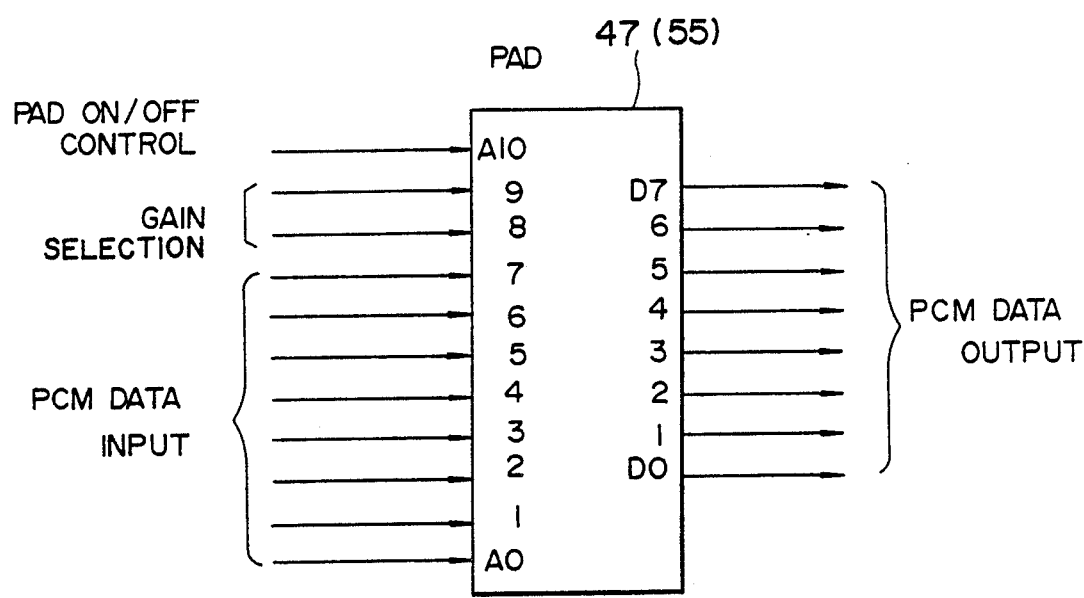
FIG. 3 is a diagram for assistance in explaining the relationship between input and output signals of a transmit/receive digital pad provided in the interface unit shown in FIG. 1.

As shown in FIG. 3, this receive digital pad 47 is constructed in such a way as to receive speech data represented by 8 lower significant address bits A0 to A7, a signal for selecting a gain represented by two middle significant bits A8 and A9; and a signal for controlling the on-off operation of this pad represented by the most significant bit 10A. Further, the gain selecting signal based on the bits A8 and A9 and the on/off control signal based on the bit 10A are given from a controller 51.

Figure 4A:
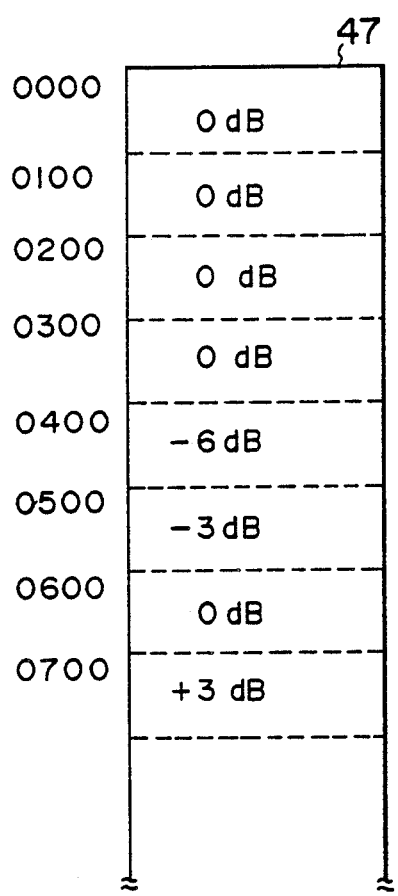
FIGS. 4(A) and 4(B) are diagrams for assistance in explaining a plurality of subpads provided in the transmit and receive digital pads, respectively.

As shown in FIG. 4, this pad 47 is provided with 8 subpads 0000 to 0700, and each subpad includes 256 address areas each of which can be selected in response to a speech data represented by bits A0 to A7. The first to fourth subpads from 0000 to 0300 are selected to produce a gain of 0 dB (i.e. no gain) when the logical value of the on/off control signal represented by a bit A10 is "0" (off). That is, 8-bit codes the same as the speech data represented by bits A0 to A7 are stored at the address areas of the subpads, respectively. The fifth to eighth subpads from 0400 to 0700 are selected to produce one of four different gains of −6, −3, 0, and +3 dB according to the logical value of the gain selecting signal represented by bits A8 and A9 when the logical value of the on/off control signal A10 is "1" (on). That is, 8-bit codes obtained by adding each gain to the speech data represented by bits A0 to A7 are stored at the address areas in the subpads, respectively.

Figure 4B:
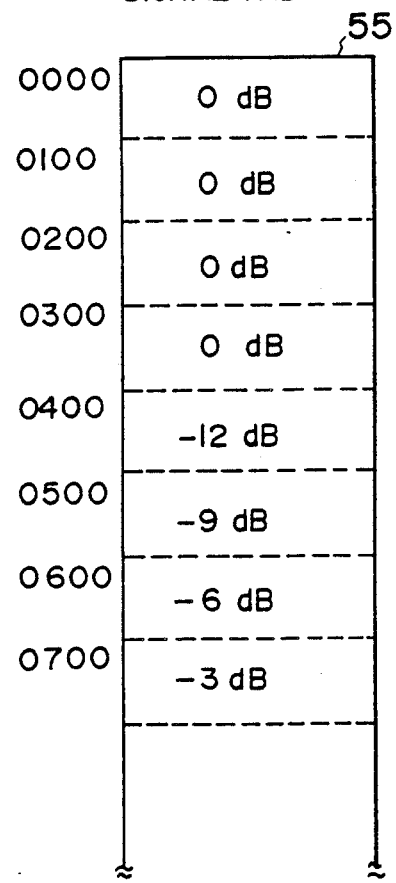

With reference to FIG. 2 again, the speech data to which a selected gain is added and read out of the receive digital pad 47 are inputted to a conversion section 53 to convert the parallel data to 2 Mbps serial data, and then superposed upon a designated time slot of an up-line of the speech high way 19. In addition, the conversion section 53 reads speech data from a designated time slot of a down-line of the speech high way 19. The read speech data are converted into parallel data and then sent out to a bus 49. The parallel speech data are inputted to a transmit digital pad 55. This transmit digital pad 55 is a ROM similar to the receive digital pad 47, and receives speech data represented by 8 lower significant address bits A0 to A7, a gain selecting signal represented by two middle significant bits A8 and A9 and an on/off control signal represented by the most significant bit 10A as shown in FIG. 3. Further, as shown in FIG. 4B the transmit digital pad 55 can select any one of gains of 0 (off), −12, −9, −6 and −3 dB.

Speech data read out of the transmit digital pad 55 are inputted to a parallel/serial converting and separating section 59 via a bus 57. The parallel/serial converting and separating section 59 converts 2-channel speech data inputted in parallel at 128 Kbps speed, respectively into serial data, separates these data according to the channels, and sends the data to a first port transmit data line P1TXD and a second port transmit data line P2TXD. These speech data are further inputted to the interface LSI 37, multiplexed with control data, converted into ternary signals by a driver/receiver 35, and then fed to a transmit interface line 33 of the ISDN line 3.

On the other hand, control data (selection signals, process identifiers, etc.) inputted to the interface LSI 37 via the ISDN line 3 are isolated from speech data, inputted to a communication repeating microprocessor 61, and then transmitted to a central control unit 20 via a data highway 17. Further, programs and other information for controlling the operation of the microprocessor 61 are stored in a ROM 63 and a RAM 65.

The control data given from the central control unit 20 to the ISDN interface unit 5 are inputted to the microprocessor 61 via the data highway 17. Some data among control data inputted to the microprocessor 61 are applied to the interface LSI 37 so as to be multiplexed with speech data before sending out to the transmit interface line 33 via the driver/receiver 35. Further, as described later, control data given from the central control unit 20 include data for controlling the receive digital pad 47 and the transmit digital pad 55. In response to the pad control data, the microprocessor 61 outputs pad control signals to the controller 51. The controller 51 sets three higher significant address bits A8, A9 and A10 applied to the receive and transmit digital pads 47 and 55 to values designated by the pad control signals, so that one subpad of each of the digital pads 47 and 55 is selected and enabled. Further, a digital PLL (phase locked loop) circuit 67 and a frequency multiplier 69 are incorporated to synchronize a clock frequency of the speech highway 19 with that of the ISDN line 3.

Figure 5:
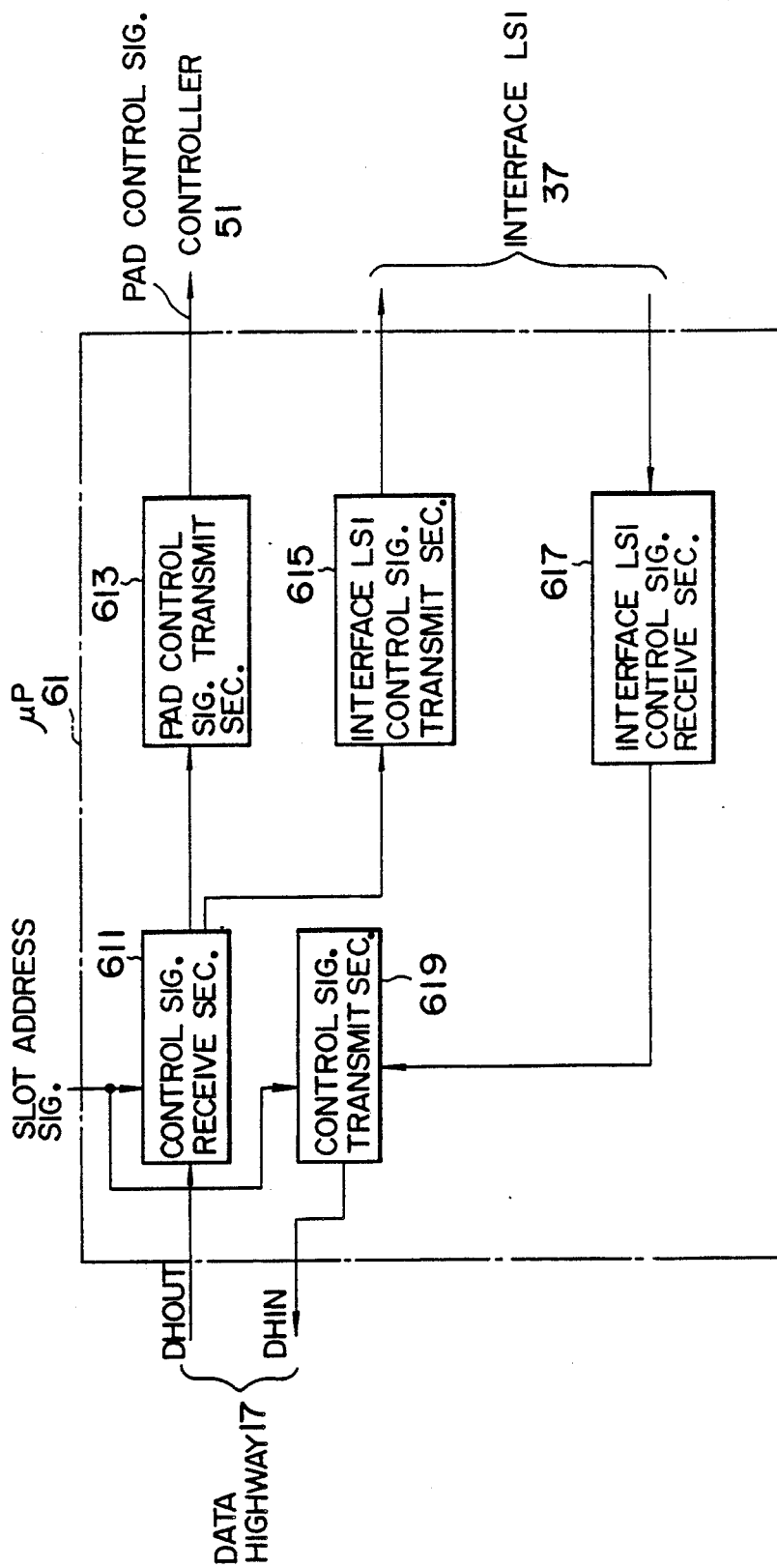
FIG. 5 is a block diagram showing a microprocessor provided in the interface unit shown in FIG. 2.

FIG. 5 shows a configuration of the microprocessor 61 within the ISDN interface unit 5. In the drawing, a control signal receive section 611 has access to a specific time slot designated by a slot address signal on a down-highway DHOUT of the data highway 17 to receive control data supplied from the central control unit 20, and separates pad control data from other control data. The separated pad control data are sent to a pad control signal transmit section 613, from which the pad control signals are transmitted to the controller 51. The other control data are transmitted to the interface LSI 37 via an interface LSI control signal transmit section 615.

An interface LSI control signal receive section 617 receives control data from the interface LSI 37, and sends the received control data to a control signal transmit section 619. The control signal transmit section 619 has access to a specific time slot designated by a slot address signal on an up-highway DHIN of the data highway 17 to transmit control data from the interface LSI 37 to this time slot. The transmitted control data are sent to the central control unit 20.

Figure 6:
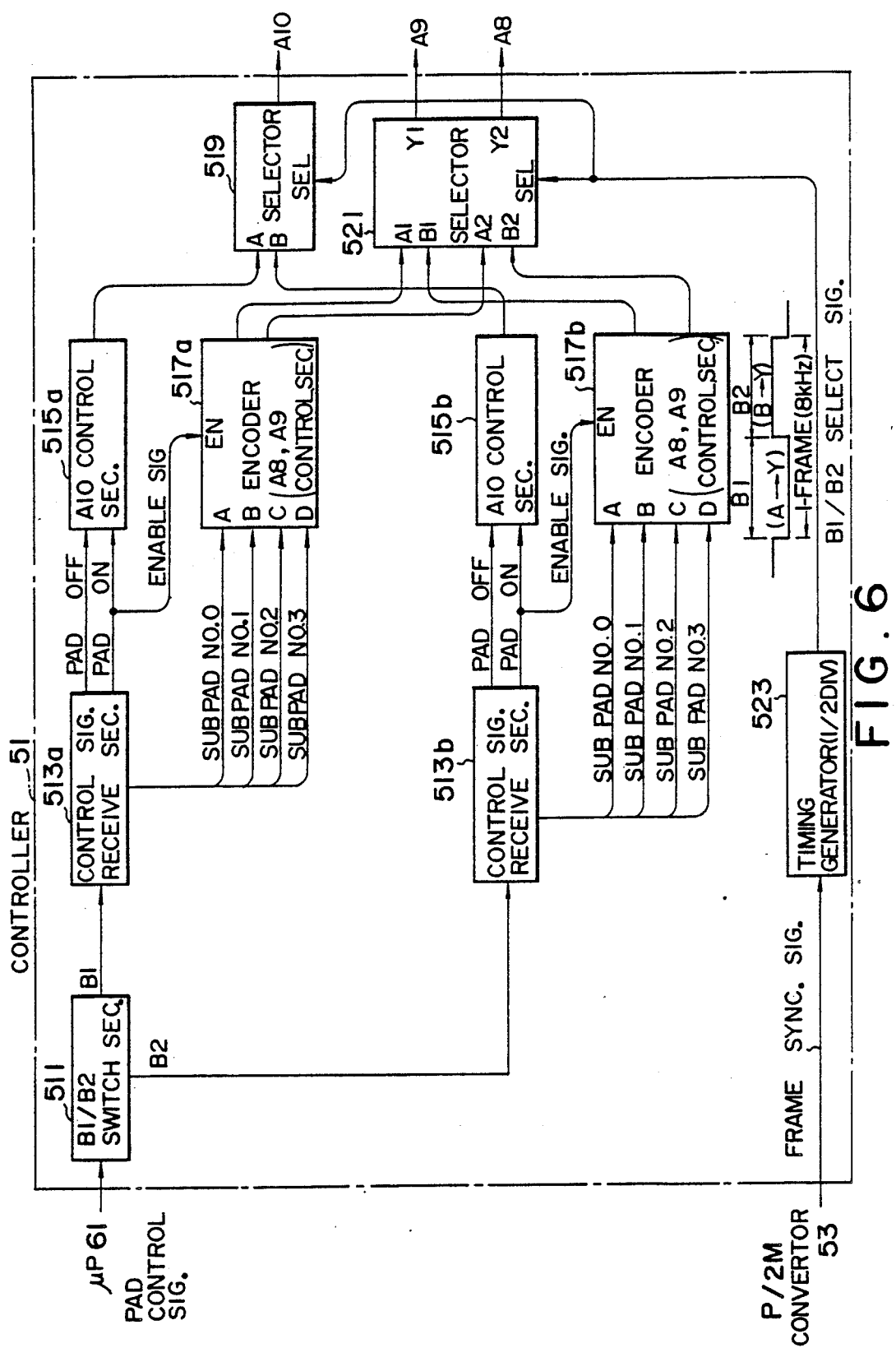
FIG. 6 is a block diagram showing a control circuit provided within the interface unit shown in FIG. 2.

FIG. 6 shows a configuration of a pad control related section of the controller 51 within the ISDN interface unit 5. In the drawing, the pad control signals from the microprocessor 61 are inputted to a B1/B2 switching section 511. This switching section 511 discriminates whether the pad control signal is related to pad control of B1 channel or B2 channel, and transmits pad control signals related to the B1 channel to a control signal receive section 513a and those related to the B2 channel to another control signal receive section 513b, respectively.

The control signal receive section 513a for receiving the B1-channel related pad control signal obtains pad on/off-related information from the control signals, and further recognizes a selected subpad number when "on" is obtained. The pad on/off information is fed to an A10 controller 515a. The A10 controller 515a forms a B1 channel related on/off control signal and outputs the formed control signal to one input terminal A of a selector 519. When B1 channel related pads are turned on, further a selected subpad number is inputted to an encoder 517a. The encoder 517a forms a 2-bit data representative of an inputted subpad number, and outputs this data to two input terminals A1 and A2 of a selector 521.

With respect to the B2 channel, the same processing as described above are implemented by a control signal receive section 513b, an A10 controller 515b and an encoder 517b. As a result, B2-channel related on/off control signal is applied to the other input terminal B of the selector 519. When B2 channel related pads are turned on, further a 2-bit data representative of a selected subpad number are applied to two input terminals B1 and B2 of the selector 521.

The selector 519 outputs an on/off control signal selected from one of two input terminals A and B. The outputted on/off control signal is applied to the most significant address bit A10 of both the receive and transmit digital pads 47 and 55. The selector 521 outputs a subpad number data selected from one pair of the input terminals A1, A2 and B1 and B2. The outputted subpad number data are added to the succeeding address bits A9 and A8.

A timing signal generating section 523 divides a frame synchronizing signal into ½ to form a B1/B2 switching signal as shown in FIG. 6. The formed switching signal is applied to the selector terminals SEL of the two selectors 519 and 521, respectively. As a result, an on/off control signal and a subpad number data related to the B1 channel are selected during a first half of each frame, and an on/off control signal and a subpad number data related to the B2 channel are selected during a second half of each frame. These selected signals and data are applied to address bits A10, A9 and A8 of the receive and transmit digital pads 47 and 55, in order to determine each gain related to the B1 or B2 channel.

Figure 7:
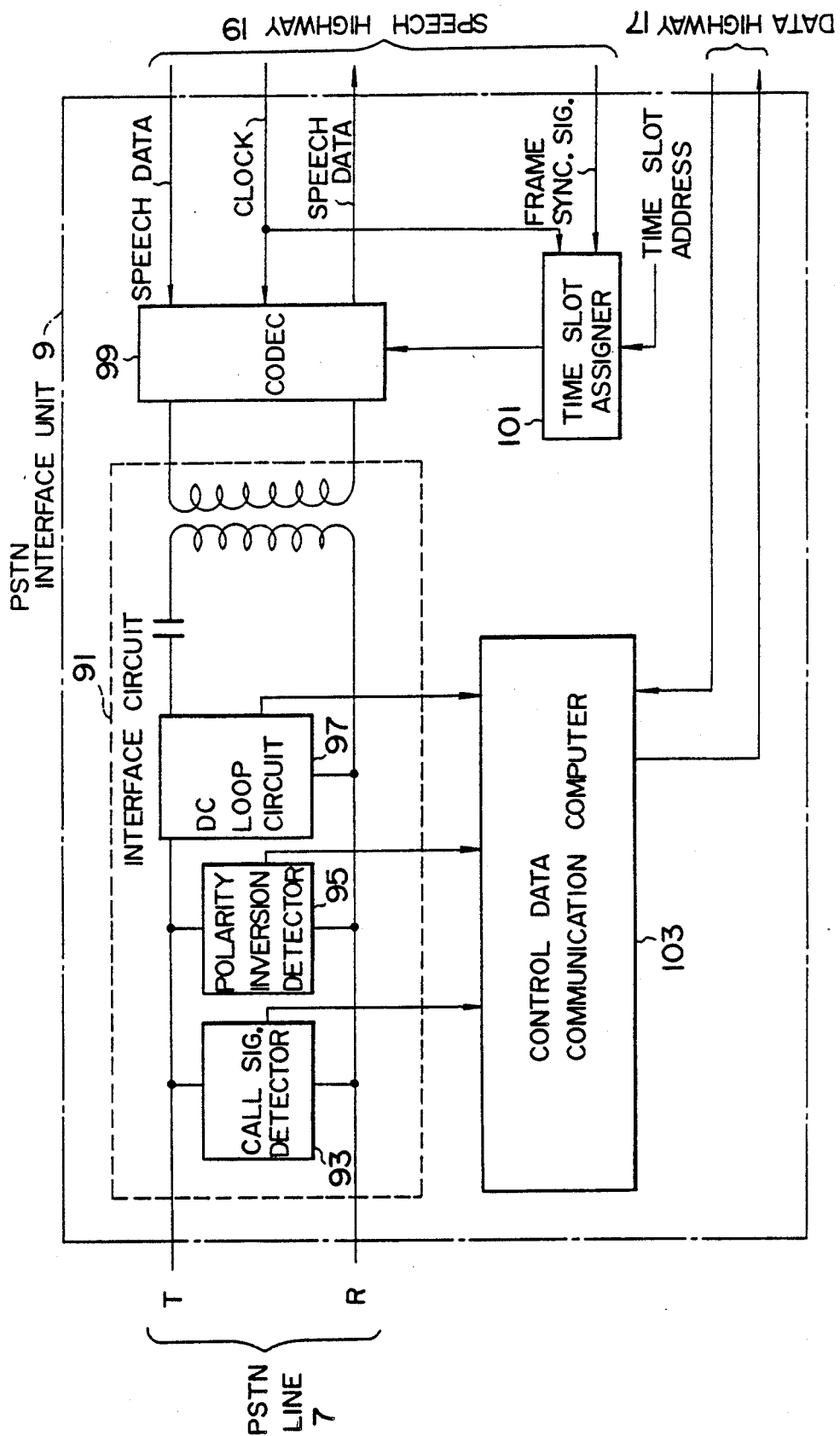
FIG. 7 is a block diagram showing a PSTN interface unit used for the afore-mentioned embodiment.

FIG. 7 shows a configuration of the PSTN interface unit 9. An interface circuit 91 including a call signal detector 93, a polarity inversion detector 95 and a dc loop circuit 97 is connected to the PSTN line 7, in order to detect a call signal from the line 7, the polarity inversion of the line 7 and the close/open of a dc loop, and further to send dial pulses to the line 7. A codec 99 converts speech signals from analog to digital or vice versa, which is connected in AC manner to the line 7 when a dc loop is closed by the DC loop circuit 97.

A time slot assigner 101 decides a timing at which the codec 99 receives or transmits speech data through the speech highway 19 on the basis of a time slot address previously determined for the codec 99, a frame synchronizing signal from the speech highway 19 and a clock, and applies a determined timing signal to the codec 99. The codec 99 receives or transmits speech data through the speech highway 19 within a time period assigned by the time slot assigner 101.

A control data communication microcomputer 103 monitors detection signals from the call signal detector 93 and the polarity inversion detector 95, controls the DC loop circuit 97, and receives and transmits various control data related to the call signal detection with respect to the central control unit 20, the polarity inversion detection, dc loop opening/closing, and the dial pulse transmission, etc. through the data highway 17.

FIG. 8 shows a configuration of a standard telephone set interface unit 15. A call signal transmitter 105 transmits a call signal (e.g. 16 Hz ac signal) supplied from a call signal generator 107 to a standard telephone set 11. A dc voltage supply circuit 109 supplies a prescribed dc voltage to the standard telephone set 11 to invert the polarity thereof, and detects the dc-loop opening/closing by the standard telephone set 11. A dial detector 111 detects a dial pulse of the telephone set 11.

A codec 113 converts speech signals from analog to digital or vice versa and receives and transmits speech data through the speech highway 19 within a time period assigned by the time slot assigner 115.

A control data communication microcomputer 117 controls the call signal transmit/interrupt (on/off), monitors the dc loop opening/closing, controls the polarity inversion, monitors the dial pulse detection result, and communicates control data with the central control unit 20 through the data highway 17.

Figure 9:
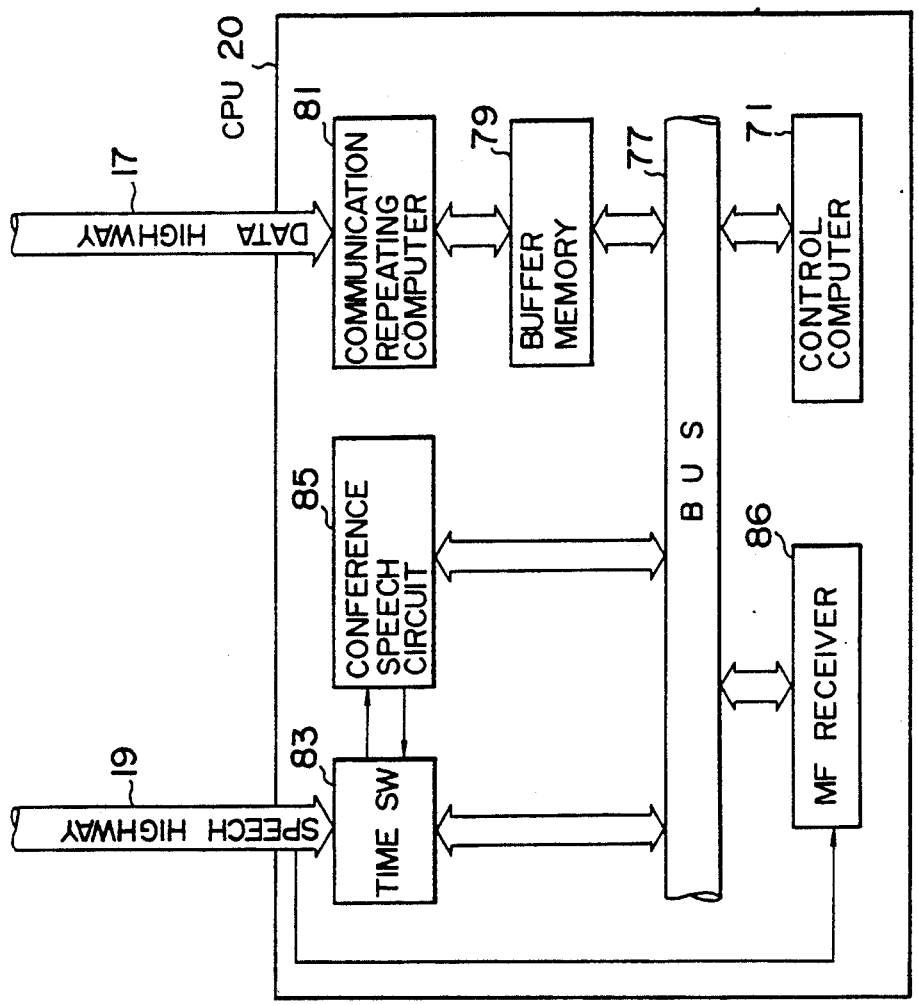
FIG. 9 is a block diagram showing a central control unit of the above embodiment; and ·

FIG. 9 shows a configuration of the central control unit 20 of this embodiment. The central control unit 20 includes a control microcomputer 71 connected to the data highway 17 via a buffer memory 79 and a communication repeating microcomputer 81. The control microcomputer 71 controls the operations of the ISDN interface unit, the PSTN interface unit and the extension line telephone set interface unit by transmitting-/receiving control data to/from these interface units through the data highway 17. This control microcomputer 71 also controls a time switch 83, a conference speech circuit 85, etc. The time switch 83 is connected to the speech highway 19 to switch speech channels. The conference speech circuit 85 is connected to the time switch 83 to process speech data during conference conversation.

An MF signal receiver 86 receives digit signals outputted from the standard telephone set 11 in the form of multifrequency code (MF signals) through the speech highway 19. In the ordinary standard telephone set 11, it is possible to select any one of MF mode in which digit signals are outputted in the form of MF signals and DP mode in which digit signals are outputted in the form of dial pulses. In this embodiment, however, an assumption is made that the MF mode is selected. Therefore, all digit signals from the standard telephone set 11 are received by the MF signal receiver 86. The MF signal receiver 86 converts the received digit signals into predetermined digital codes to transmit these to the control microcomputer 71.

Figure 10:
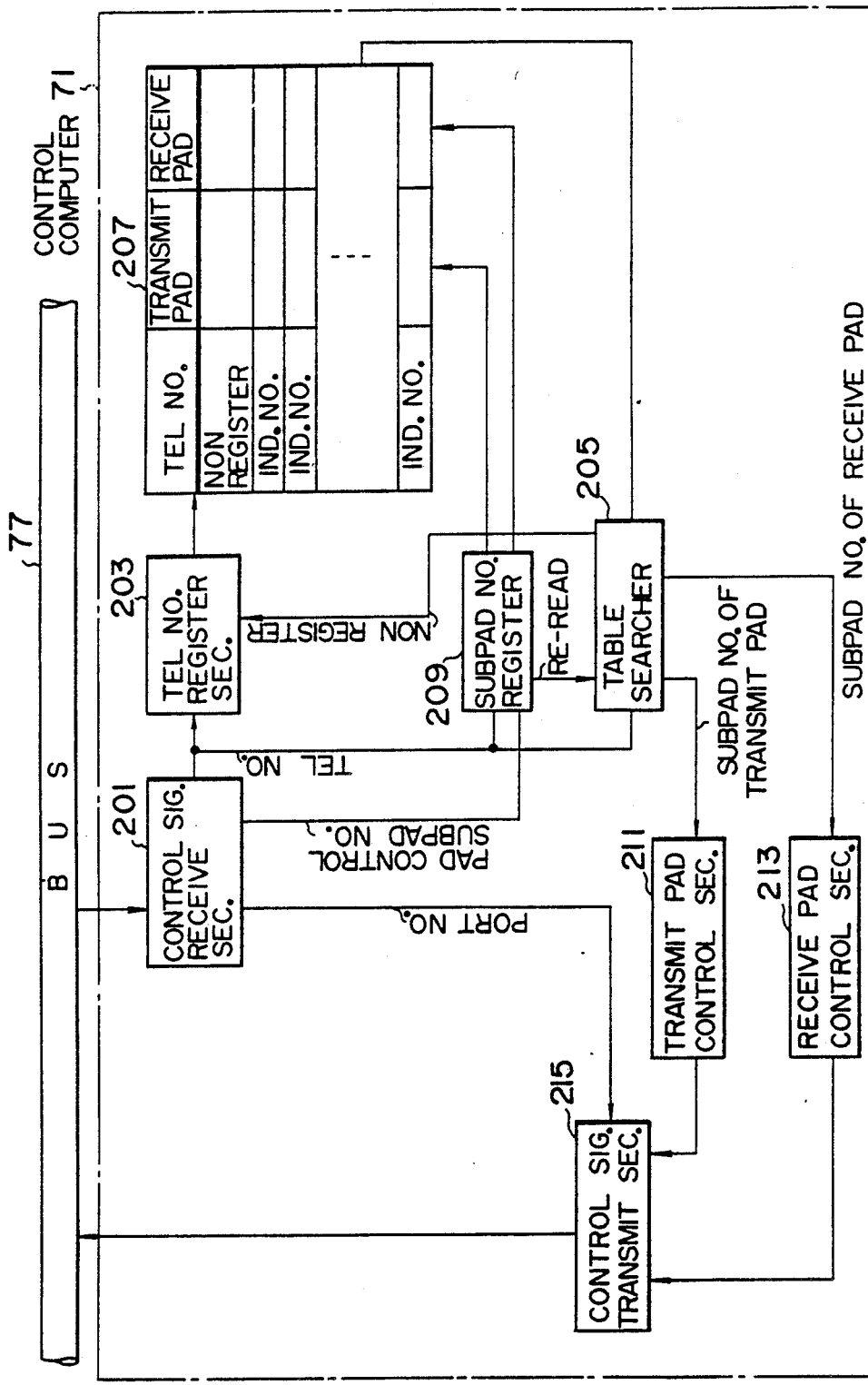
FIG. 10 is a block diagram showing a microcomputer incorporated in the central control unit shown in FIG. 9.

FIG. 10 shows the configuration of a part of the control microcomputer 71, which relates to pad control. In the drawing, a control signal receiving section 201 receives various control data given from the data highway 17 to the bus 77 via the communication repeating microcomputer 81, and digit signals given from the speech highway 19 to the bus 77 via the MF receiver 86, in order to decode these data and signals.

When an outgoing call is transmitted from the standard telephone set 11 to the ISDN line 3, digit signals indicative of a port number which designates the ISDN line 3 and a channel to be used and indicative of a telephone number of a called subscriber are transmitted from the standard telephone set 11 and received by a control signal receive section 201. On the other hand, when an incoming call is transmitted from the ISDN line 3 to the standard telephone set 11, control data indicative of a port number which designates the ISDN line 3 and a channel called and indicative of a telephone number of a calling subscriber are transmitted from the ISDN interface unit 5 to the control signal receive section 201. In these cases, the control signal receive section 201 gives the received port number to a control signal transmit section 215, and the received telephone number to a telephone number register section 203 and a table searcher 205.

In response to the given telephone number, the table searcher 205 makes an access to a telephone number-subpad number table 207 to search the given telephone number. This table 207 is formed with a plurality of areas where telephone numbers are registered and areas where transmit/receive digital subpad numbers related to the registered telephone numbers are registered, respectively. In the areas at which telephone numbers are registered, the areas written as "INDIVIDUAL No." are those at which individual telephone numbers are registered, and the areas written as "NON-REGISTERED" are those representative of all the non-registered telephone numbers. Further, "0" indicative of turned-off pad is registered as an initial value in each area at which a subpad number is registered.

In the above-mentioned searching operation, the table searcher 205 first scans "INDIVIDUAL No." areas to check whether the given telephone number has already been registered. If registered, the table searcher 205 reads the transmit/receive subpad numbers registered with respect to the given telephone number from the table 207, and sends the read subpad numbers to a transmit pad control section 211 and a receive pad control section 213. The transmit/receive pad control sections 211 and 213 send these subpad numbers to a control signal transmit section 215. This control signal transmit section 215 forms pad control data including these subpad numbers and the port number (given from the control signal receive section 201), and sends the control data to the ISDN interface unit 5. In this way, a subpad having a subpad number registered with respect to the given telephone number: can be selected within the ISDN interface unit 5.

Where the given telephone number is not registered as the result of the above-mentioned search operation, the table searcher 205 reads the transmit/receive subpad numbers registered with respect to the "NON-REGISTERED" area from the table 207, and sends these numbers to the transmit pad control section 211 and a receive pad control section 213. The transmit pad control section 211, the receive pad control section 213, and the control signal transmit section 215 all operate in quite the same way as described before. In this way, a subpad having a subpad number registered with respect to the "NON-REGISTERED" can be selected within the ISDN interface unit 5.

As described above, in response to an outgoing call or an incoming call to or from the ISDN line 3, a subpad of the previously-registered number is selected to start conversation. In case the selected pad is not appropriate, it is possible to change the selected pad during conversation in accordance with the following process procedure:

First, digit signals indicative a series of previously determined digits for requesting pad control are transmitted from the standard telephone set, and received by the control signal receive section 201. Then, the control signal receive section 210 gives a pad control request to the subpad number register section 209. Since the subpad number register section 209 previously receives the telephone number at an outgoing call or at an incoming call, in response to the pad control request the subpad number register section 209 searches an "INDIVIDUAL No." area (at which the corresponding telephone number is registered) from a table 207, and becomes a setup status where the subpad number registered with respect to the telephone number can be rewritten. Subsequently, digit signals indicative of a new subpad number are transmitted from the standard telephone set 11, received by the control signal receive section 201, and then given to the subpad number register section 209. Thereupon, the subpad number register section 209 rewrites the old subpad number already registered with respect to the telephone number as a new subpad number. After this rewriting operation, the subpad number register section 209 instructs a table searcher 205 to rewrite the new subpad number. The table searcher 205 reads the new subpad number from the table 207 and then transmits it to a transmit pad control section 211 and a receive pad control section 213. As a result, a new subpad of a newly registered subpad number is selected by the ISDN interface unit 5.

Further, it is also possible to change the subpad number registered in "NON-REGISTERED" area of the table 207. This can be done if the above-mentioned specific digit signals for pad control request are inputted from the standard telephone set 11, when the standard telephone set 11 is in incoming call waiting mode. In this case, since the subpad number register section 209 does not previously receive the telephone number, in response to the pad control request the register section 209 is set to a setup status where a subpad number registered with respect to the "NON-REGISTERED" area in the table 207 can be rewritten. Processing after that is the same as the afore-mentioned subpad change processing during conversation.

The subpad numbers registered with respect to the "NON-REGISTERED" area can be applied to communications through the ISDN with all the subscribers except the telephone numbers registered in the "INDIVIDUAL No." areas.

As described above, in the key telephone system of the present invention, when specific subpad numbers have been registered from extension telephone sets (in call waiting mode) to the key service unit, upon an incoming or outgoing call through the ISDN a subpad having a previously registered subpad number can be automatically selected, and then a gain corresponding to the subpad is added to the speech signals. Further, once a specific subpad number is inputted and registered from the extension telephone set to the key service unit during conversation between the extension telephone set and a specific subscriber through the ISDN, thereafter upon an incoming call from a specific subscriber or an outgoing call to a specific subscriber through the ISDN, a subpad of a subpad number registered for the specific subscriber can be selected automatically. Further, if no subpad numbers are registered, pads are automatically turned off.

In the above embodiment, the standard telephone set has been adopted as the extension telephone set. Without being limited thereto, it is of course possible to use a digital key telephone set. In the case of a digital key telephone set, however, it is necessary to provide another interface unit for digital key telephone sets within the key service unit, in addition to the elements shown in FIG. 1 or in place of the standard telephone interface unit. When the pad control is executed by means of the digital key telephone set, the processing within the key service unit is substantially the same as that in the aforementioned embodiment, excepting one point that digit signals transmitted from the digital key telephone set are inputted to the central control unit through the control data highway.

There exists a certain key telephone system connectable to a data terminal such as a personal computer as an extension station, as well as a telephone set. The present invention is applicable to such a key telephone system as described above. In this case, however, when the data terminal transmits or receives data through the ISDN, the digital pads should be turned off to protect the data from being damaged.

The present invention can be applied not only the key telephone system but also the simple telephone set, as far as the telephone can be connected to both the analog line and the digital line.

What is claimed is:

1. A telephone system connectable to both a digital communication network and an analog communication network, comprising:
   (a) terminal means provided with functions of transmitting/receiving speech signals;
   (b) digital network interface means for providing an interface for communicating the speech signals in digital code form between the terminal means and the digital communication network;
   (c) analog network interface means for providing an interface for communicating the speech signals in analog signal form between the terminal means and the analog communication network;
   (d) speech level attenuating means for selecting a gain required to compensate for a difference in relative speech signal level between the digital communication network and the analog communication network, and for adding the selected gain to the speech signals communicated in digital code form between the terminal means and the digital communication network; and
   (e) gain control means for controlling the gain selection by the speech level attenuating means.

2. The telephone system of claim 1, wherein the speech level attenuating means is a code conversion memory for receiving the digital code form speech signal as an address signal and reading a digital code previously stored at an address designated by the received address signal, and each digital code previously stored at each address indicates a value obtained by adding the selected gain to each address.

3. The telephone system of claim 2, wherein the code conversion memory includes a plurality of submemories at each address of which a digital code obtained by adding a previously determined gain to each address is stored at each address in such a way that the gain is different for each submemory, and the gain control means controls the code conversion memory so that either one of the plural submemories is selectively enabled.

4. The telephone system of claim 3, wherein the gain control means comprises:
   register means for previously registering a select information signal indicative of which submemory to be selected from plural submemories;
   reading means for reading the registered select information signal from the register means when communication of the speech signals is made between the terminal means and the digital communication network; and
   control means for controlling the code conversion memory to enable a submemory indicated by the read select information signal.

5. The telephone system of claim 3, wherein the gain control means comprises:
   table means for previously registering a select information signal indicative of which submemory to be selected from plural submemories and telephone numbers;
   reading means for reading the select information signal from the table means, when communication of the speech signals is made through the digital communication network between the terminal means and a subscriber specified by the registered telephone numbers; and
   control means for controlling the code conversion memory to enable a submemory indicated by the read select information signal.

6. A key telephone system connectable to both a digital communication network and an analog communication network and having a key service unit with speech channel switching means and an extension telephone set connected to the key service unit, comprising:
   digital network interface means incorporated in the key service unit, for providing an interface for communicating speech signals in digital code form between the speech channel switching means and the digital communication network so as to allow communication via the speech channel switching means between the telephone set and the digital communication network;
   analog network interface means incorporated in the key service unit, for providing an interface for communicating speech signals in analog signal form between the speech channel switching means and the analog communication network so as to allow communication via the speech channel switching means between the telephone set and the analog communication network;
   speech level attenuating means incorporated in the digital network interface means, for selecting a gain required to compensate for a difference in relative speech signal level between the digital communication network and the analog communication network and for adding the selected gain to the speech signals in digital code form communicated between the switching means and the digital communication network; and
   gain control means incorporated in the key service unit, for controlling the gain selection by the speech level attenuating means.

* * * * *